US007592380B2

(12) United States Patent  (10) Patent No.: US 7,592,380 B2
Fournier et al.  (45) Date of Patent: Sep. 22, 2009

(54) FIRE RESISTANT COMPOSITION IN PARTICULAR FOR ENERGY OR TELECOMMUNICATION CABLES

(75) Inventors: Jérôme Fournier, Lyons (FR); Christian Koelbin, Meximieux (FR)

(73) Assignee: Nexans, Paris (FR)

( * ) Notice: Subject to any disclaimer, the term of this patent is extended or adjusted under 35 U.S.C. 154(b) by 584 days.

(21) Appl. No.: 11/318,054

(22) Filed: Dec. 23, 2005

(65) Prior Publication Data

US 2006/0273289 A1  Dec. 7, 2006

(30) Foreign Application Priority Data

Dec. 24, 2004  (FR) .................................. 04 53225

(51) Int. Cl.
C08L 97/02  (2006.01)
C08K 5/00  (2006.01)
C09K 21/06  (2006.01)
C09K 21/14  (2006.01)

(52) U.S. Cl. ................... 524/16; 252/609; 252/601; 252/602

(58) Field of Classification Search .................. 524/16; 252/609

See application file for complete search history.

(56) References Cited

U.S. PATENT DOCUMENTS 1,914,097 A * 6/1933 Barker ......................... 428/389

| 2,904,524 | A | * | 9/1959 | Baumgartner, Jr. | .......... 523/446 |
| 4,876,142 | A | * | 10/1989 | Piccirillo | ....................... 442/43 |
| 5,221,781 | A | * | 6/1993 | Aida et al. | ................... 524/433 |
| 6,576,691 | B2 | * | 6/2003 | Nakashima et al. | .......... 524/101 |
| 2002/0161093 | A1 | * | 10/2002 | Nakashima et al. | .......... 524/436 |
| 2003/0100683 | A1 | * | 5/2003 | Toyoizumi et al. | ........ 525/331.9 |
| 2005/0038186 | A1 | * | 2/2005 | Morikawa et al. | .............. 525/98 |
| 2006/0154038 | A1 | * | 7/2006 | Kanae et al. | .................. 428/220 |
| 2007/0270540 | A1 | * | 11/2007 | Kanae et al. | .................. 524/515 |
| 2008/0033083 | A1 | * | 2/2008 | Li et al. | ........................ 524/115 |
| 2008/0153941 | A1 | * | 6/2008 | Fournier et al. | .............. 523/173 |

FOREIGN PATENT DOCUMENTS

EP  1347107  9/2003
JP  10259942  3/2000

OTHER PUBLICATIONS

Japan English language machine translation of JP Publication No. 2000-084908 (Mar. 28, 2000).*

* cited by examiner

*Primary Examiner*—Joseph D Anthony
(74) *Attorney, Agent, or Firm*—Sofer & Haroun, LLP

(57) ABSTRACT

The present invention concerns a fire resistant composition particularly for a power and/or telecommunications cable, said composition comprising a polymer and a fire retardant filler. The invention is remarkable in that the polymer is thermoplastic in type and in that the fire retardant filler comprises cork.

9 Claims, 3 Drawing Sheets

FIRE RESISTANT COMPOSITION IN PARTICULAR FOR ENERGY OR TELECOMMUNICATION CABLES

RELATED APPLICATIONS

The present application is related to and claims the benefit of priority from French Patent Application No. 04 53225, filed on Dec. 24, 2004, the entirety of which are incorporated herein by reference.

FIELD OF THE INVENTION

The present invention relates to a composition for a material which is capable of resisting extreme heat conditions.

The invention finds particularly advantageous but not exclusive application in the field of power or telecommunications cables which are intended to remain operational for a predetermined period of time when they are subjected to strong heat and/or direct flame.

BACKGROUND OF THE INVENTION

One of the major current challenges to the cable industry lies in improving the behavior and performance of cables under extreme heat conditions, in particular those encountered during the course of a fire. Mainly for safety reasons, it is vital to maximize the capacity of a cable both to retard the propagation of flames, and to resist the fire. Significantly slowing the advance of flames increases the time available for evacuation of sites and/or for using appropriate extinguisher means. Better fire resistance means that the cable can function longer, since it degrades more slowly. A safety cable must also not be dangerous to the environment, i.e. it must not release toxic fumes and/or fumes that are too dense when it is subjected to extreme heat conditions.

Whether electrical or optical, intended for power transport or for data transmission, a cable is constituted in outline by at least one conductor element extending inside at least one insulating element. It should be noted that at least one of the insulating elements may also act as a protective means and/or the cable may further comprise at least one specific protective element, forming a sheath. However, many of the best insulating and/or protective materials used in the cable industry are unfortunately highly flammable. This is particularly the case with polyolefins and their copolymers, such as polyethylene, polypropylene, copolymers of ethylene and vinyl acetate, and copolymers of ethylene and propylene. At all events, in practice, such excessive flammability proves to be completely incompatible with the fire performance requirements mentioned above.

Many methods exist in the cable industry for improving the fire performance of polymers used as insulating and/or sheathing materials.

Until now, the most popular solution has consisted in using halogenated compounds in the form of a halogenated derivative dispersed in a polymer matrix or directly in the form of a halogenated polymer, as is the case with a PVC, for example. However, regulations are now tending towards prohibiting the use of that type of substance, mainly because of their toxicity and their potential corrosivity, whether on manufacture of the material or during its decomposition by fire. This is the case both when the decomposition in question occurs unintentionally during a fire and also when it is intentionally incinerated. Whatever the case, recycling halogenated materials remains a particular problem.

For this reason, more and more non halogenated fire retardant fillers are being used, in particular metallic hydroxides such as aluminum hydroxide or magnesium hydroxide. Unfortunately, that type of technical solution suffers from the disadvantage of requiring large quantities of fillers to be satisfactory, either in terms of flame propagation retarding capacity or of fire resistance. As an example, the metallic hydroxide content can typically be 150 to 200 parts by weight per 100 parts by weight of polymer resin.

However, any bulk incorporation of a filler causes a considerable increase in the viscosity of the material which receives it. This then inevitably generates a substantial reduction in the extrusion rate, and consequently a significant reduction in productivity, which is unfortunately reflected in the cost price of the composite material.

However, independently of this process aspect, non halogenated fire retardant fillers have in any event proved to be intrinsically relatively expensive. And since they have to be used in large quantities, the cost of the materials in which they are dispersed is further increased.

OBJECTS AND SUMMARY OF THE INVENTION

Thus, the technical problem to be solved by the present invention is to propose a fire resistant composition, in particular for a power and/or telecommunications cable material, said composition comprising a polymer and a fire retardant filler, which composition can overcome the problems of the prior art and in particular be cheaper, while guaranteeing good fire performance.

In accordance with the present invention, the solution to the technical problem consists in that the polymer is thermoplastic in type, and in that the fire retardant filler comprises cork.

It should be pointed out that the term "thermoplastic type polymer" designates both a thermoplastic polymer and a thermoplastic elastomer polymer, and that the cork may be in any form which is capable of being dispersed in the polymer matrix.

In any event, the invention as defined has the advantage of having a particularly low cost price because of the extremely low cost of its fire retardant filler, especially when compared with that of conventional prior art fillers. This constitutes a major economic advantage in the cable industry, since it will encourage the market penetration of fire retardant cables.

When also considering the fact that the use of a cork-based fire retardant filler can also substantially improve the fire performance of a polymer material over that of corresponding prior art materials, it then becomes clear that a composition of the invention has a price/performance advantage.

In a currently preferred implementation of the invention, the cork in the fire retardant filler is in powder form.

It should be understood that the term "powder" is used herein very generally to designate any solid substance divided into very small homogeneous particles. This means that the particles in question may be have any shape, and not necessarily that of grains. This includes fibers.

In any event, and particularly advantageously, the powdered cork has a grain size of less than 600 micrometers (μm), preferably less than 200 μm.

In accordance with a feature of the invention, the polymer is selected from a polyethylene, a polypropylene, a copolymer of ethylene and propylene (EPR), an ethylene-propylene-diene terpolymer (EPDM), a copolymer of ethylene and vinyl acetate (EVA), a copolymer of ethylene and methyl acrylate (EMA), a copolymer of ethylene and ethyl acrylate (EEA), a copolymer of ethylene and butyl acrylate (EBA), a copolymer of ethylene and octene, a polymer based on ethylene, a polymer based on polypropylene, a polyetherimide, a thermoplastic polyurethane, a polyester, a polyamide, or any mixture of said components.

In accordance with a further advantageous feature of the invention, the composition comprises 5 to 100 parts by weight of fire retardant filler per 100 parts by weight of polymer, preferably 10 to 30 parts by weight of fire retardant filler.

In accordance with a further feature of the invention, the composition is further provided with at least one secondary fire retardant filler.

Particularly advantageously, each secondary fire retardant filler is selected from phosphorus-containing compounds such as organic or inorganic phosphates, antimony-containing compounds such as antimony oxide, metallic hydroxides such as aluminum hydroxide and magnesium hydroxide, boron-based compounds such as borates, carbonates of alkali metals from groups IA and IIA such as calcium, sodium, potassium, or magnesium carbonates and the corresponding hydroxycarbonates, tin-based compounds such as stannates and hydroxystannates, melamine and its derivatives such as melamine phosphates, and formophenolic resins.

In accordance with a still further feature of the invention, the composition is also provided with at least one additive selected from the group formed by pigments, antioxidants, and ultraviolet stabilizers, as well as processing aids such as lubricants, plasticizers, and heat stabilizers.

The invention also provides any cable comprising at least one conductive element extending inside at least one insulating covering, with at least one insulating covering of the cable being produced from a composition as described above.

The invention also provides any cable provided with at least one conductive element extending inside at least one insulating covering, and further comprising at least one protective sheath produced from a composition as described above.

It should be noted that the term "conductive element" designates both an electrical conductor and an optical conductor. Further, and in all cases, the cable may equally well be an electrical cable or an optical cable, in particular intended for power transport and/or for data transmission.

DETAILED DESCRIPTION

Figure 1:
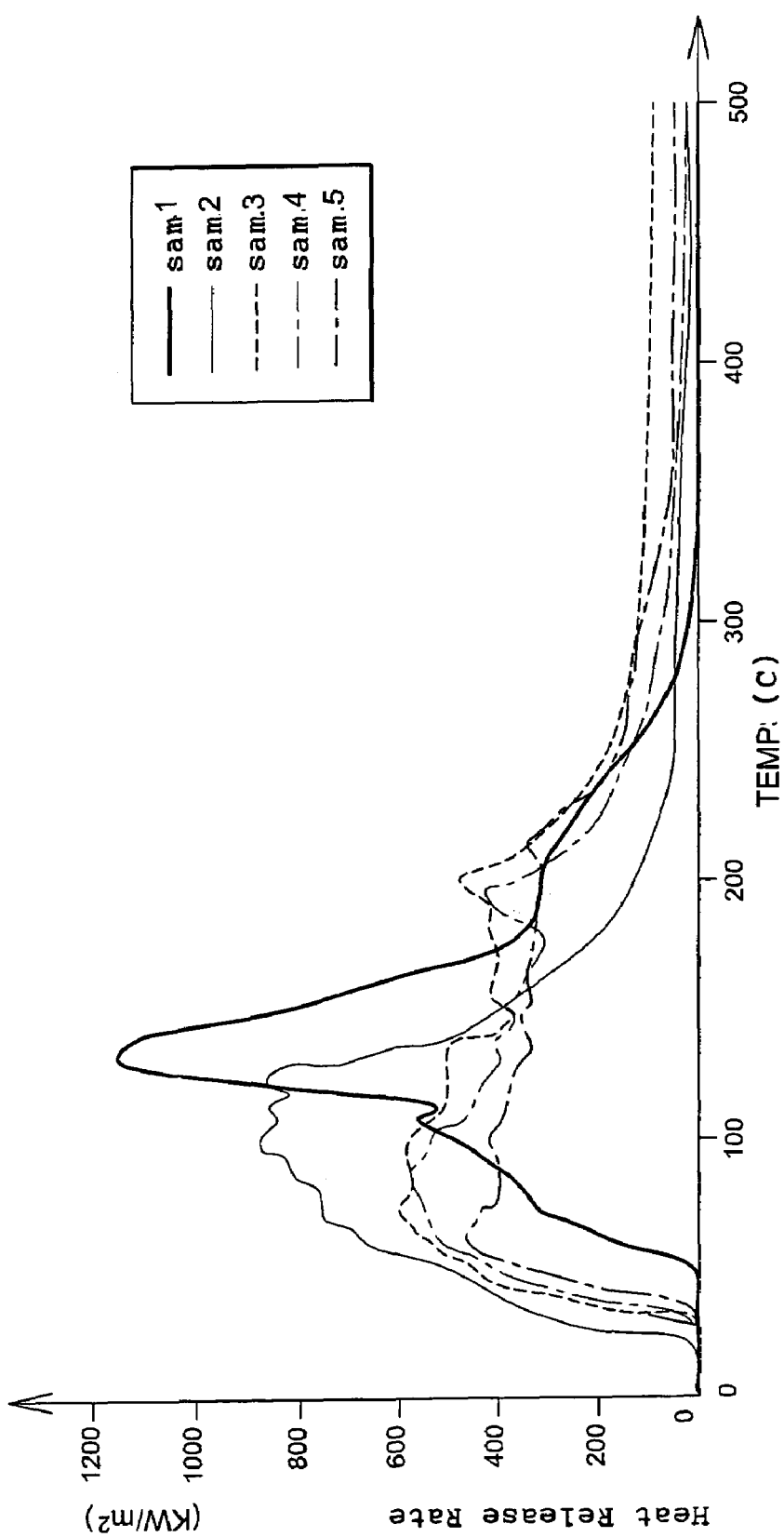
FIG. 1 is a heat release rate chart for samples 1 through 5, in accordance with one embodiment of the present invention.

Other characteristics and advantages of the present invention will become clear from the following description of examples which are given by way of non limiting illustration.

Examples I to IV relate to compositions that are all capable of being used to produce insulating and/or sheathing and/or packing materials for power cables and/or telecommunications cables.

These compositions consist of a polymer matrix in which a cork-based fire retardant filler is dispersed. The polymer is common to each of them, and only the nature and quantity of the fire retardant filler varies from one sample to another.

In this respect, it may be observed that one of the compositions constitutes an extreme case and to this end, it should be considered as a reference. In fact, it is constituted solely by polymer. In other words, the quantity of fire retardant filler therein is zero.

Finally, it should be noted that the quantities mentioned in the various tables shown below are conventionally expressed as parts by weight per 100 parts by weight of polymer.

Preparation of Compositions

At all events, the various compositions studied in Examples I to IV were all prepared using the same operating protocol.

The steps of mixing the polymer matrix with each fire retardant filler were thus as follows:
  temperature fixed at 160° C. throughout mixing;
  introduction of synthetic polymer into the internal mixer adjusted to 30 revolutions per minute (rpm);
  fusion of the synthetic polymer at 160° C. for 2 minutes at 30 rpm;
  fusion at 60 rpm for 2 minutes;
  introduction of fire retardant filler at 30 rpm;
  mixing at 30 rpm for about 10 minutes.

Example I

Example I is intended to evaluate the fire performance of a fire retardant filler based on a first type of cork.

The polymer matrix used was a copolymer of ethylene and vinyl acetate (EVA) containing 28% of vinyl acetate, a product sold under the trade name Evatane 28-03 by Atofina.

The fire retardant filler was an Amorim® MFI powdered cork of Portuguese origin, having a grain size of d50<100 μm and d90<300 μm.

Four material samples 2 to 5 were prepared using the operating protocol described above, employing increasing quantities of fire retardant filler. Sample 1 constituted the reference composition. Table 1 details the differences in compositions between Samples 1 to 5.

TABLE 1

| | Samples | | | | |
|---|---|---|---|---|---|
| | 1 | 2 | 3 | 4 | 5 |
| EVA | 100 | 100 | 100 | 100 | 100 |
| Cork 1 | 0 | 10 | 20 | 30 | 50 |
| Total | 100 | 110 | 120 | 130 | 150 |

Cone calorimeter analyses were carried out to evaluate and compare the fire performance of Samples 1 to 5.

To this end, the corresponding materials were first formed into square plates with sides of 10 centimeters (cm) and depth of 3 millimeters (mm). This operation was carried out using a heated hydraulic press employing the following procedure:
  fusing at 150° C. for 3 minutes;
  pressurizing to 150 bars for 2 minutes, keeping at 150° C.;
  cooling with water at 150 bars for 5 minutes.

Samples 1 to 5 were then tested using a cone calorimeter in accordance with International Standard ISO 5660-1 pertaining to the heat release rates of building materials.

The heat release rate during combustion of each sample was measured. FIG. 1 illustrates the respective performance of the various materials.

Table 2 summarizes the principal characteristics of Samples 1 to 5 in terms of fire performance, namely the average heat release rate and the peak heat release rate in kilowatts per square meter ($kW/m^2$)

TABLE 2

|  | Sample | | | | |
| --- | --- | --- | --- | --- | --- |
|  | 1 | 2 | 3 | 4 | 5 |
| Amount of cork | 0 | 10 | 20 | 30 | 50 |
| Cork content | 0% | 9% | 17% | 23% | 33% |
| Average heat release rate ($kW/m^2$) | 321.15 | 298.51 | 223.90 | 133.92 | 104.78 |
| Reduction in average heat release rate compared with Sample 1 | 0% | 7% | 30% | 58% | 67% |
| Peak heat release rate ($kW/m^2$) | 1447.07 | 830.87 | 585.18 | 570.82 | 472.50 |
| Reduction in peak heat release rate compared with Sample 1 | 0% | 43% | 60% | 61% | 67% |

The average heat release rate and the peak heat release rate allow the energy released by a material during combustion to be determined. The lower the heat release rate, the less combustible the material.

Sample 1 has the properties of the polymer matrix and as such constitutes a reference.

With Sample 2, it can be seen that adding only 10 parts by weight of cork to the same polymer results in a reduction of 43% in the peak heat release rate compared with Sample 1. The active effect of cork is thus demonstrated. The filler does not just act as a diluent, which would lower the peak heat release by about 9%, but also acts as a fire retardant filler since the reduction is 43%.

Samples 3 to 5 show that an increase in the amount of cork in the composite material generates a large reduction in the peak heat release rate and in the average heat release rate. Thus, adding 50 parts by weight of cork to the polymer causes a reduction of 67% in the peak amount and the average heat release rate, which produces a material with very good reaction to fire even with such a low filler content.

Example II

Example II is intended to determine the fire performance of a fire retardant filler based on a second type of cork.

The polymer matrix used in this second example was again a copolymer of ethylene and vinyl acetate (EVA) containing 28% of vinyl acetate, a product sold under the trade name Evatane 28-03 by Atofina.

However, in this case the fire retardant filler was constituted by Amorim® MF7 powdered cork from Portugal, with a grain size of d50=300 µm and d90<600 µm.

Four material samples 6 to 9 were prepared, again using the operating protocol described above, using increasing quantities of fire retardant filler. Sample 1 was again employed as the reference. Table 3 details the differences in compositions between Samples 1 and 6 to 9.

TABLE 3

|  | Samples | | | | |
| --- | --- | --- | --- | --- | --- |
|  | 1 | 6 | 7 | 8 | 9 |
| EVA | 100 | 100 | 100 | 100 | 100 |
| Cork 2 | 0 | 10 | 20 | 30 | 50 |
| Total | 100 | 110 | 120 | 130 | 150 |

In order to determine and compare the fire performance of Samples 6 to 9, cone calorimeter analyses were carried out in a manner entirely similar to that described for Example I.

Thus, the corresponding materials were formed into plates, faithfully following the steps of the shaping procedure described above.

Figure 2:
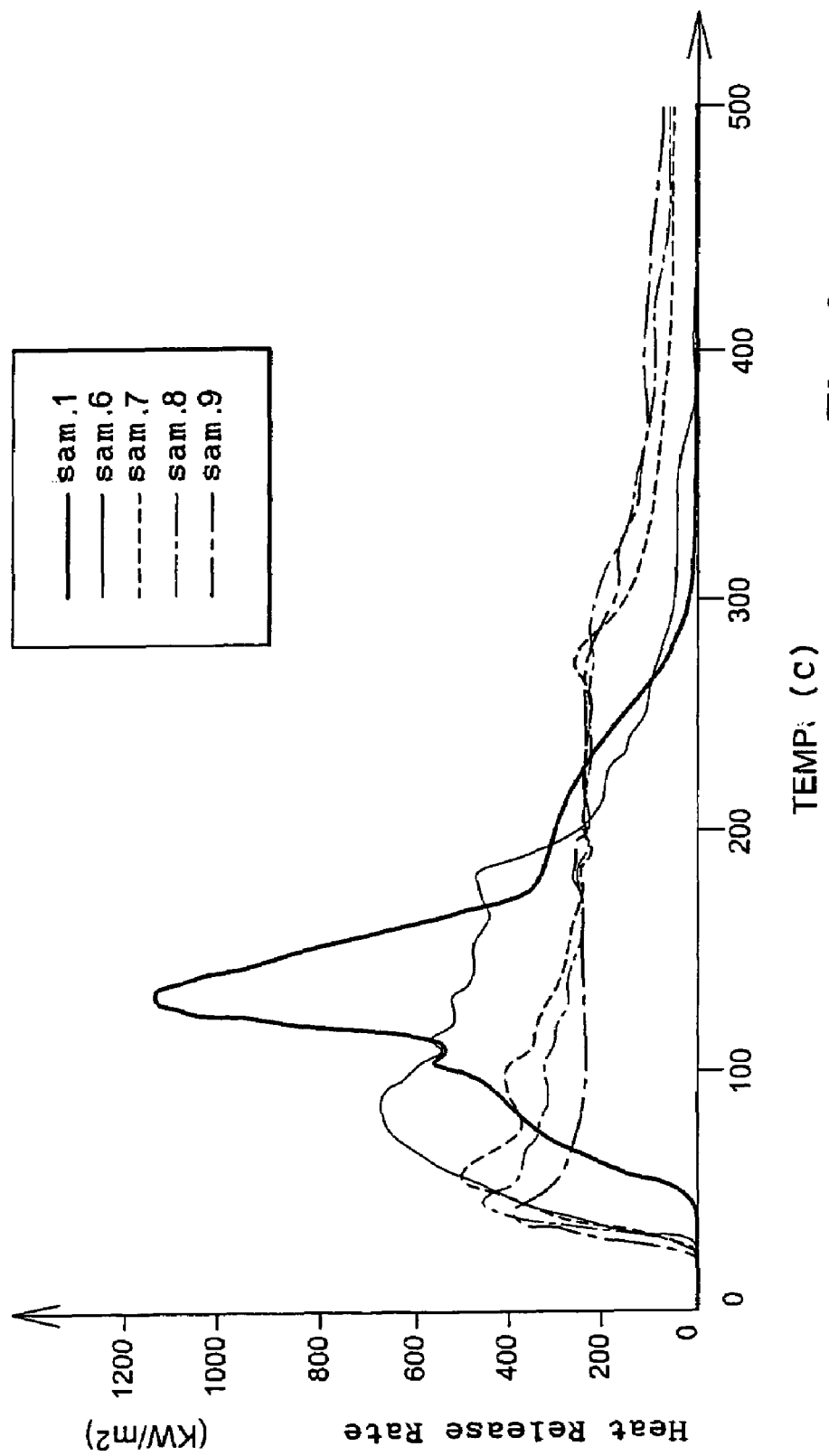
FIG. 2 is a heat release rate chart for samples 1 and 6 through 9, in accordance with one embodiment of the present invention.

Samples 6 to 9 were then tested using a cone calorimeter in accordance with International Standard ISO 5660-1 pertaining to heat release rates in building materials. Here again, the heat release rate during combustion of each sample was measured. FIG. 2 illustrates the respective performance of the various materials.

Table 4 summarizes the principal characteristics of Samples 1 and 6 to 9 as regards fire performance, namely the average heat release rate and the peak heat release rate.

TABLE 4

|  | Sample | | | | |
| --- | --- | --- | --- | --- | --- |
|  | 1 | 6 | 7 | 8 | 9 |
| Amount of cork | 0 | 10 | 20 | 30 | 50 |
| Cork content | 0% | 9% | 17% | 23% | 33% |
| Average heat release rate ($kW/m^2$) | 321.15 | 247.91 | 125.43 | 121.06 | 111.82 |
| Reduction in average heat release rate compared with Sample 1 | 0% | 23% | 61% | 62% | 65% |
| Peak heat release rate ($kW/m^2$) | 1447.07 | 650.84 | 483.61 | 431.13 | 372.50 |
| Reduction in peak heat release rate compared with Sample 1 | 0% | 55% | 67% | 70% | 74% |

With Sample 6, it can be seen that adding only 10 parts by weight of cork to the polymer matrix results in a reduction of 55% in the peak heat release rate by Sample 1. As in Example I, the active effect of cork is thus demonstrated. Here again, the filler does not just act as a diluent, which would lower the peak heat release rate by about 9%, but also as a fire retardant filler since the reduction is 55%.

However, it should be noted that the active effect of the cork is not strongly dependent on the type of cork used. Example II shows that the MF7 cork performed better than the MF1 cork of Example I, but the fire retardant effect remains of the same order of magnitude (43% as opposed to 55% at 10 parts by weight).

Samples 7 to 9 show that an increase in the amount of cork in the composite material generates a large reduction in the peak heat release rate and in the average heat release rate. Thus, adding 50 parts by weight of MF7 cork to the polymer can reduce the peak and average heat release rate by 74% and 65% respectively, which means that a material can be produced with a reaction to fire that is very good for its low filler content.

Example III

Finally, Example III evaluates the fire performance of a fire retardant filler based on a third type of cork.

The polymer matrix used was again a copolymer of ethylene and vinyl acetate (EVA) containing 28% of vinyl acetate, a product sold under the trade name Evatane 28-03 by Atofina.

However, this time the fire retardant filler was composed of powdered cork from France of the Liegeur® trademark, with a grain size of d50<100 µm and d90<300 µm.

Four material samples 10 to 13 were prepared, again using the operating protocol of Examples I to IV, using increasing quantities of fire retardant filler. Table 5 details the differences in compositions between Samples 1 and 10 to 13.

TABLE 5

|  | Samples | | | | |
| --- | --- | --- | --- | --- | --- |
|  | 1 | 10 | 11 | 12 | 13 |
| EVA | 100 | 100 | 100 | 100 | 100 |
| Cork 3 | 0 | 10 | 20 | 30 | 50 |
| Total | 100 | 110 | 120 | 130 | 150 |

Once again, the corresponding materials were firstly formed into plates before carrying out cone calorimeter analyses in order to evaluate and compare the fire performance of Samples 10 to 13. The procedure followed was once again International Standard ISO 5660-1 pertaining to heat release rates in building materials.

Figure 3:
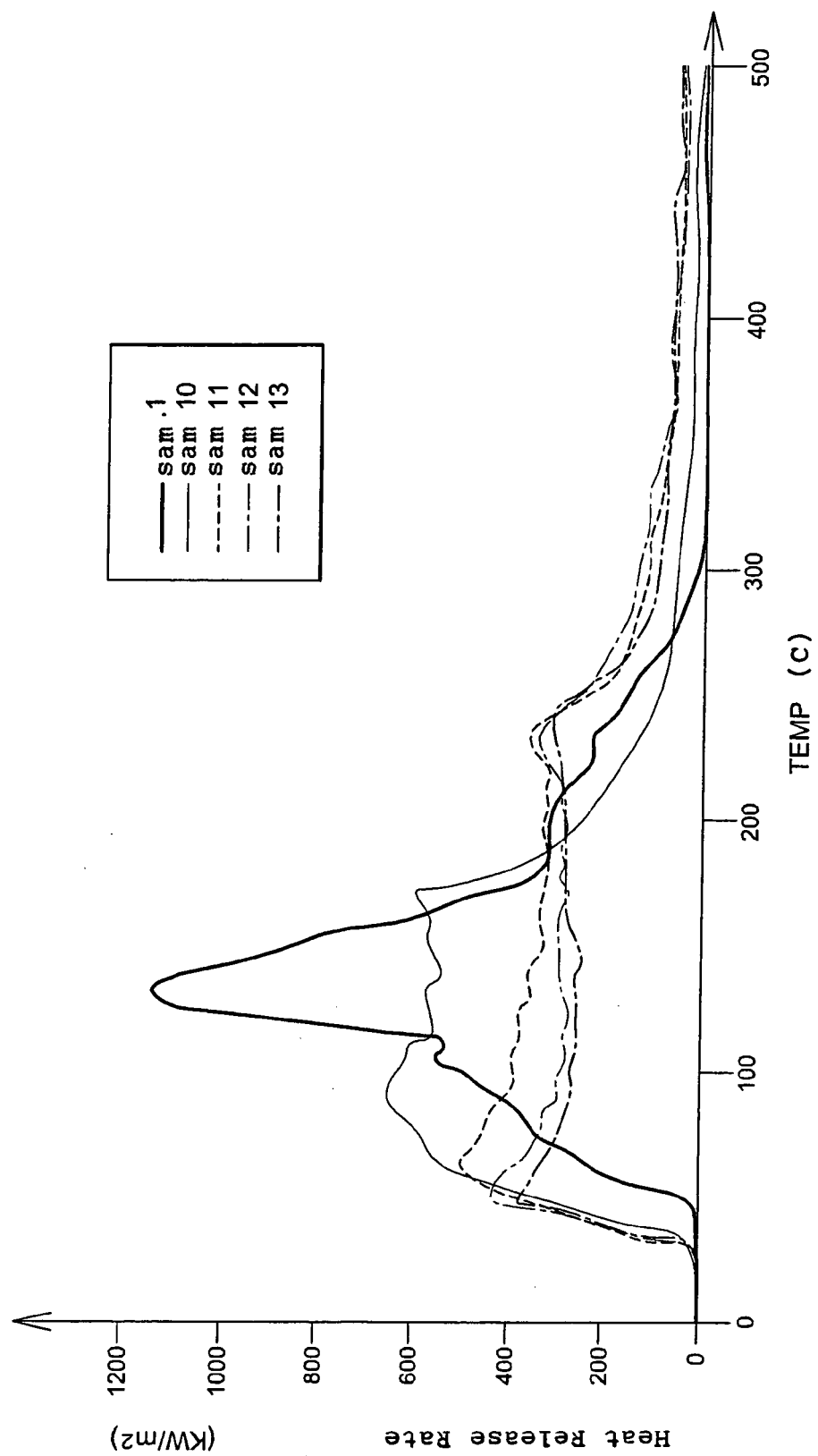
FIG. 3 is a heat release rate chart for samples 1 and 10 through 13, in accordance with one embodiment of the present invention.

The heat release rate during combustion of each sample was measured. FIG. 3 illustrates the respective performance of the various materials.

Table 6 summarizes the principal characteristics of Samples 1 and 10 to 13 as regards fire performance, namely the average heat release rate and the peak heat release rate.

TABLE 6

|  | Sample | | | | |
| --- | --- | --- | --- | --- | --- |
|  | 1 | 10 | 11 | 12 | 13 |
| Amount of cork | 0 | 10 | 20 | 30 | 50 |
| % of cork | 0% | 9% | 17% | 23% | 33% |
| Average heat release rate (kW/m$^2$) | 321.15 | 172.21 | 150.61 | 109.39 | 83.40 |
| Reduction in average heat release rate compared with Sample 1 | 0% | 46% | 53% | 66% | 74% |
| Peak heat release rate (kW/m$^2$) | 1447.07 | 671.82 | 505.71 | 432.01 | 377.24 |
| Reduction in peak heat release rate compared with Sample 1 | 0% | 54% | 65% | 70% | 74% |

This Example III demonstrates a fire retardant effect that is comparable to those described in the preceding examples. The cork used was again of a different nature, but the fire retardant effect remained of the same order.

However, it should be noted that this novel type of cork can further reduce the average heat release rate compared with Examples I and II.

The reduction in the peak heat release rate in Samples 10 to 13 is identical to that obtained for Example II with Samples 6 to 9.

The reduction in the average and peak heat release rate observed between Samples 10 to 13 shows that a material can be obtained having a reaction to fire that is exceptional, with a 74% reduction in the heat release rate, with only 50 parts by weight of cork per 100 parts by weight of polymer.

Example IV

Example IV compares the fire performance of the fire retardant fillers of the invention with those of conventional prior art fillers.

Samples 6, 8 and 9, which represent materials deriving from compositions filled with cork, were entirely in accordance with those prepared and tested in the context of Example II.

Samples A, B and C, which were used here as references, employed fire retardant fillers constituted by aluminum trihydroxide, usually known by its abbreviation ATH. The product used was Martinal OL-104 from Martinswerk GmbH. Their polymer matrices were all constituted by a copolymer of ethylene and vinyl acetate (EVA) containing 28% vinyl acetate, in this case Evatane 28-03 again from Atofina.

The three material samples A, B and C were again prepared using the operating protocol used in Examples I to IV, and using increasing quantities of fire retardant filler. Table 7 details the features of each of the compositions employed.

TABLE 7

| Samples | EVA (%) | ATH (%) | Cork (%) |
| --- | --- | --- | --- |
| 1 | 100 | 0 | 0 |
| A | 91 | 9 | 0 |
| 6 | 91 | 0 | 9 |
| B | 77 | 23 | 0 |
| 8 | 77 | 0 | 23 |
| C | 67 | 33 | 0 |
| 9 | 67 | 0 | 33 |

The samples were then tested using a cone calorimeter to determine and then compare their respective fire performances. Their prior shaping was again carried out using the procedure defined in ISO 5660-1 pertaining to heat release rates in building materials.

The heat release rate was thus measured during combustion of each sample. Table 8 summarizes the principal characteristics of the various samples in terms of fire performance, namely the average heat release rate and the peak heat release rate.

TABLE 8

| Sample | Average heat release rate (kW/m$^2$) | Peak heat release rate (kW/m$^2$) | Reduction in peak heat release rate compared with Sample 1 |
| --- | --- | --- | --- |
| 1 | 321.15 | 1447.07 | 0 |
| A | 242.02 | 1273.76 | 12% |
| 6 | 247.91 | 650.84 | 55% |
| B | 278.22 | 939.51 | 35% |
| 8 | 121.06 | 431.13 | 70% |
| C | 166.95 | 610.86 | 58% |
| 9 | 111.82 | 372.50 | 74% |

It can be seen that Samples 6, 8 and 9 performed better than Samples A, B and C respectively. In fact, while the reduction in the peak heat release rate was of the order of 12% for a composite containing 10 parts by weight of aluminum hydroxide, it reached 55% for a composite containing the same quantity of cork.

The fire retardant active effect of aluminum hydroxide, known in the prior art, was confirmed with Samples A, B and C since the reduction in the heat release rate was greater than reduction due solely to dilution of the combustible polymer. However, the fire retardant effect of cork in this same polymer appeared to be substantially greater: at 10 parts by weight (samples A and 6), the cork was more than 4.5 times more active than aluminum hydroxide; at 30 parts (Samples 8 and B), the cork was 2 times more active than aluminum hydroxide; and at 50 parts, the cork could further improve the reaction to fire by about 30% compared with aluminum hydroxide.

This example thus confirms that cork plays an exceptional active fire retardant role compared with prior art systems.

The invention claimed is:

1. A fire resistant composition, in particular for a power or telecommunications cable material, said composition comprising:
   a polymer and a fire retardant filler, wherein the polymer is thermoplastic in type, and the fire retardant filler is cork in powder form, wherein the D50 grain size of the cork is below 200 μm.

2. A composition according to claim 1, wherein the polymer is selected from a polyethylene, a polypropylene, a copolymer of ethylene and propylene (EPR), an ethylene-propylene-diene terpolymer (EPDM), a copolymer of ethylene and vinyl acetate (EVA), a copolymer of ethylene and methyl acrylate (EMA), a copolymer of ethylene and ethyl acrylate (EEA), a copolymer of ethylene and butyl acrylate (EBA), a copolymer of ethylene and octene, a polymer based on ethylene, a polymer based on polypropylene, a polyetherimide, a thermoplastic polyurethane, a polyester, a polyamide, or any mixture of said components.

3. A composition according to claim 1, wherein the composition is 5 to 100 parts by weight of fire retardant filler per 100 parts by weight of polymer.

4. A composition according to claim 1, further comprising at least one secondary fire retardant filler.

5. A composition according to claim 4, wherein each secondary fire retardant filler is selected from phosphorus-containing compounds including organic or inorganic phosphates, antimony-containing compounds including antimony oxide, metallic hydroxides including aluminum hydroxide and magnesium hydroxide, boron-based compounds including borates, carbonates of alkali metals from groups IA and IIA including calcium, sodium, potassium or magnesium carbonates and the corresponding hydroxycarbonates, tin-based compounds including stannates and hydroxystannates, melamine and its derivatives including melamine phosphates, and formophenolic resins.

6. A composition according to claim 1, further comprising at least one additive selected from the group formed by lubricants, plasticizers, thermal stabilizers, pigments, antioxidants and ultraviolet stabilizers.

7. A cable having at least one conductive element extending inside at least one insulating covering, wherein at least one insulating covering is a composition according to the preceding claim 1.

8. A cable having at least one conductive element extending inside at least one insulating covering, wherein it further comprises at least one protective sheath, said sheath is a composition according to claim 1.

9. A composition according to claim 3, wherein the composition is 10 to 30 parts by weight of fire retardant filler per 100 parts by weight of polymer.

* * * * *